G. H. WHEARY.
AUTOMOBILE WARDROBE TRUNK HOLDER.
APPLICATION FILED FEB. 12, 1917.
1,313,968.
Patented Aug. 26, 1919.
2 SHEETS—SHEET 1.
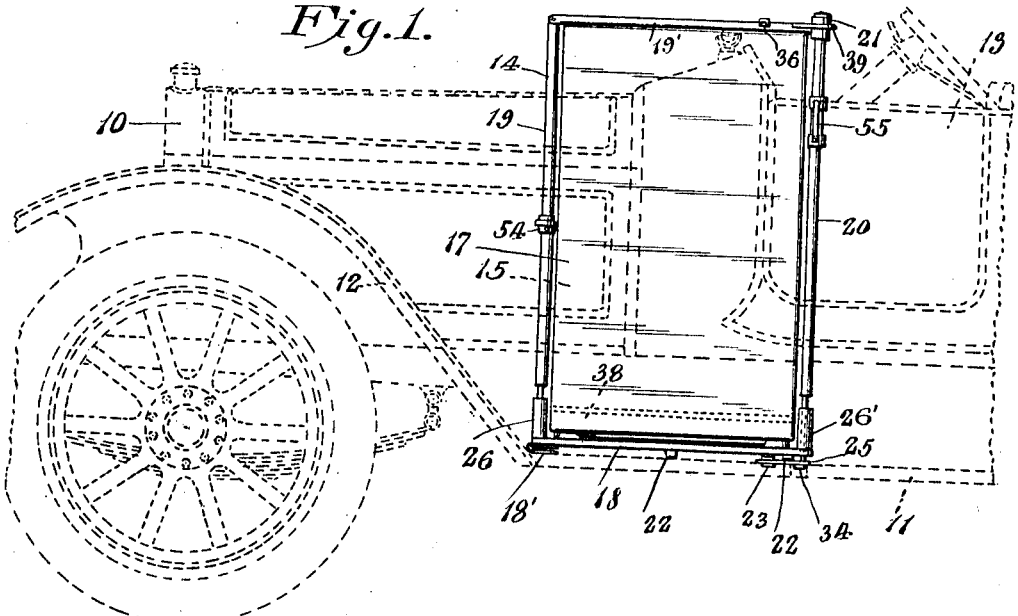
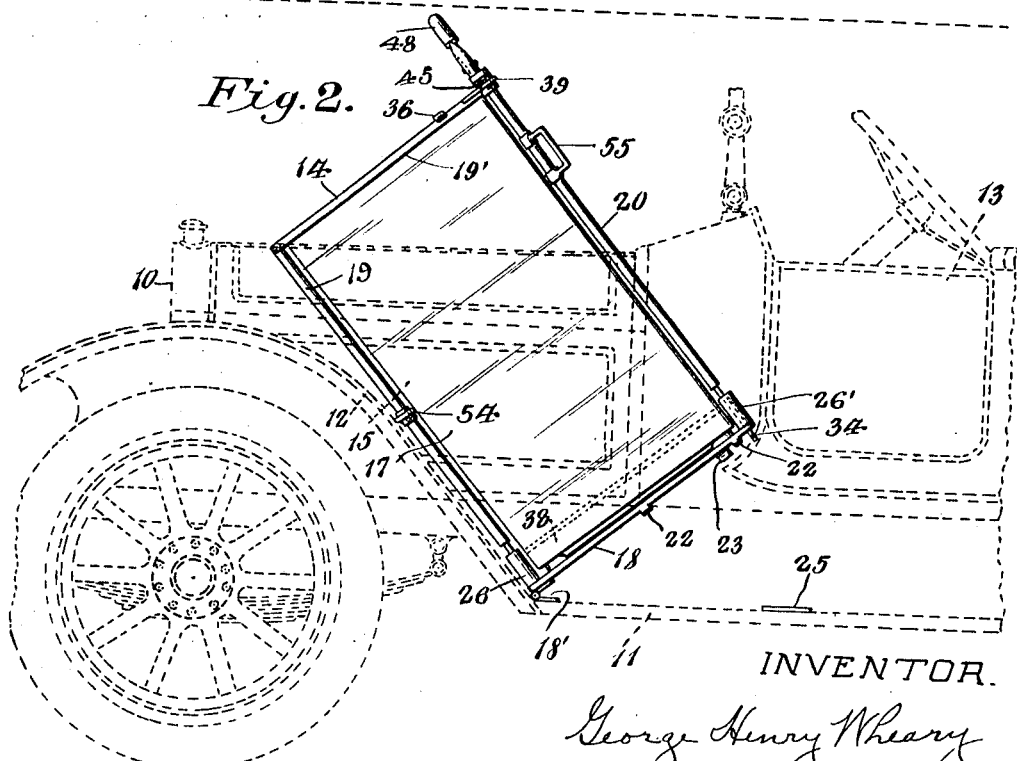
INVENTOR.
George Henry Wheary
By Morsell, Keeney & Frank
Attorneys.

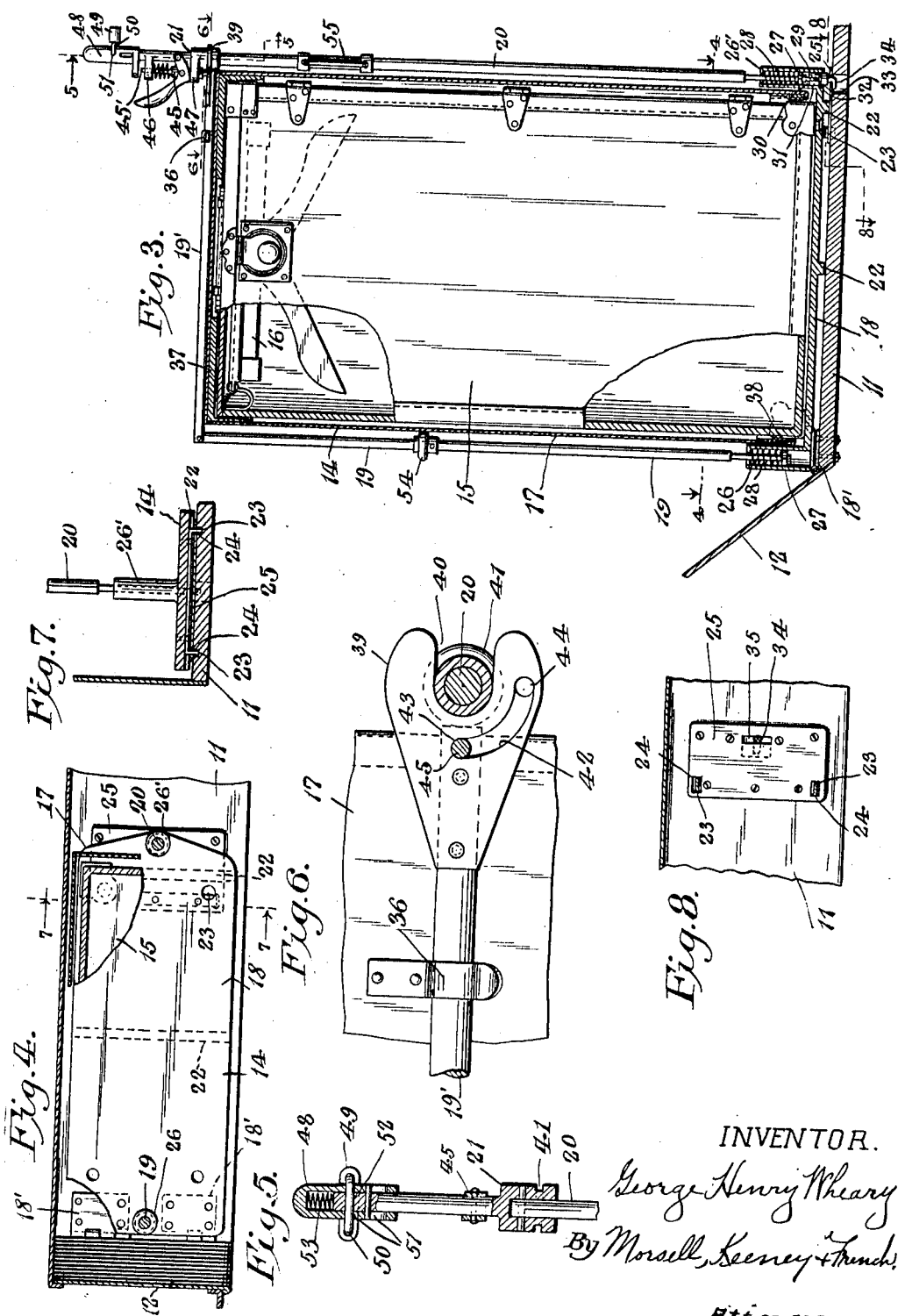
G. H. WHEARY.
AUTOMOBILE WARDROBE TRUNK HOLDER.
APPLICATION FILED FEB. 12, 1917.
1,313,968. Patented Aug. 26, 1919.
2 SHEETS—SHEET 2.
INVENTOR.
George Henry Wheary
By Morsell, Keeney + French
Attorneys.

UNITED STATES PATENT OFFICE.

GEORGE HENRY WHEARY, OF RACINE, WISCONSIN.

AUTOMOBILE WARDROBE-TRUNK HOLDER.

1,313,968.  Specification of Letters Patent.  Patented Aug. 26, 1919.

Application filed February 12, 1917. Serial No. 148,022.

*To all whom it may concern:*

Be it known that I, GEORGE HENRY WHEARY, a citizen of the United States, and resident of Racine, in the county of Racine and State of Wisconsin, have invented new and useful Improvements in Automobile Wardrobe-Trunk Holders, of which the following is a description, reference being had to the accompanying drawings, which are a part of this specification.

This invention relates to improvements in automobile wardrobe trunk holders.

It is one of the objects of the present invention to provide a means for detachably mounting a wardrobe trunk upon the running board of an automobile in such a manner that it may be easily swung to a position to permit all of the doors of the automobile to be easily opened or closed without detaching the trunk from the holder.

A further object of the invention is to provide an automobile wardrobe trunk holder in which the trunk is maintained in an upright position on the running board alongside of one of the doors of the automobile in such a manner that a portion of the holder with the trunk locked thereto may be swung forwardly to permit the opening of the automobile door without unlocking the trunk from the holder.

A further object of the invention is to provide an automobile trunk holder in which portions of the trunk holder are easily locked in closed position and yieldingly hold the trunk in such a manner as to absorb to a large extent the shock and jars incidental to traveling over rough roads.

A further object of the invention is to provide an automobile wardrobe trunk holder which is of simple construction, is strong and durable and is well adapted for the purpose described.

With the above and other objects in view the invention consists of the improved automobile wardrobe trunk holder and its parts and combinations as set forth in the claims and all equivalents thereof.

In the accompanying drawings in which the same reference characters indicate the same parts in all of the views:

Figure 1 is a side view of the improved automobile wardrobe trunk holder shown mounted upon the running board of an automobile, the automobile being indicated by dotted lines and a portion of the locking means broken away;

Fig. 2 is a similar view with the trunk holder shown as tilted in its forward position;

Fig. 3 is a vertical sectional view in part and on a larger scale of the trunk holder, portions of the trunk being broken away;

Fig. 4 is a transverse sectional view of the holder taken on line 4—4 of Fig. 3, a portion of the trunk shown positioned on the holder;

Fig. 5 is a sectional detail view of the locking portion of the holder taken on line 5—5 of Fig. 3;

Fig. 6 is a sectional detail view taken on line 6—6 of Fig. 3;

Fig. 7 is a sectional detail view taken on line 7—7 of Fig. 4; and

Fig. 8 is a sectional detail view taken on line 8—8 of Fig. 3.

Referring to the drawings the numeral 10 indicates a portion of an automobile, 11 one of the running boards, 12 one of the front wheel mud guards, 13 one of the automobile doors and 14 the improved wardrobe trunk holder mounted on the running board.

A wardrobe trunk 15 having garment hangers 16 supported in its upper end portion, is shown as mounted on the holder. A water and dust proof cover 17 preferably formed of rubber covered or other cloth impervious to moisture is provided for the trunk.

The holder comprises a base member 18 adapted to have its forward end portion positioned adjacent the mud guard and hinged to the running board 11 by hinges 18′, upright trunk engaging members 19 and 20 and a locking means 21 for securing the upper end portions of the upright members together.

The base member 18 is approximately of rectangular form and is provided with supporting ribs 22 on its lower side which bear upon and slightly space the said member from the running board, and is also provided with depending lugs 23 which enter recesses 24 in the locking plate 25 mounted on the running board 11 to prevent side movement of the base member. Upstanding tubular portions 26 and 26′ formed on the opposite end portions of the base member are adapted to yieldingly and slidably receive the lower end portions of the trunk engaging members 19 and 20. The lower end portion of the member 19 is of less diameter than the main portion and is provided with a collar 27 on its lower end. A coiled spring 28 surrounding the reduced portion and interposed between the collar 27 and the upper end portion of the tubular part 26 tends to yieldingly pull said member 19 downwardly. The other member 20 is also provided with a reduced lower end portion which enters the tubular part 26′ and is provided with a collar 27.

A coiled spring 28 surrounding the reduced end portion of the rod 20 and interposed between its collar and the upper end part of the tubular portion 26′ acts in the same manner as the spring of the other member 19. The lower end portion 29 of the member 20 is flattened and enters the transverse slot 30 formed in the upper end portion of a locking member 31 which is journaled in the tubular portion 26′. The locking member forms substantially an extension of the member 20 and is turned thereby and the flattened portion and slot connection between the two parts permits the independent longitudinal movement of the member 20. The locking member 31 is held against longitudinal movement by a pin 32 which extends transversely through the tubular portion 26′ and through an annular groove 33 formed in the locking member. The lower end of the locking member is formed with a depending angular part 34 which extends through an elongated opening 35 of the plate 11 and may be locked to the plate by turning the angular extension at right angles to the elongated opening so that the extension will catch under the plate. The running board 11 is cut away beneath the elongated opening 35 to permit the turning of the angular part 34.

The trunk engaging member 19 is preferably, although not necessarily, formed in two parts of which the upper portion 19′ is hinged to the upper end of the lower portion and swings over and rests upon the upper end of the trunk and its cover. In engaging the upper end of the trunk cover the member 19′ swing beneath a spring clip 36 which holds the parts in engagement with each other. The spring is rigidly mounted on top of the trunk cover and the reinforcing portion 37 which forms part of said cover. This reinforcing portion 37 is in the form of an inverted tray which extends over the upper end of the trunk and maintains the cover in position. The lower end of the cover is reinforced by a metal band 38 which holds the said lower portion in its lower position.

The free end portion of the hinged arm is provided with a segmental locking plate 39 having a slot or recess 40 for receiving the annularly grooved portion 41 of the locking member 21. The said locking plate is provided with a segmental recess 42 having locking openings 43 and 44 at its opposite ends to receive the lower end portion of the spring pressed locking dog 45 which forms part of the locking member 21. The locking opening 43 extends into the end portion of the part 19′ to form a more rigid connection when in locked position. The locking dog 45 extends vertically alongside of the locking member 21 and through bearing arms 46 and 47 projecting from said member and its upper end portion 45′ terminates a slight distance beneath an adjustable handle 48 slidably mounted on the upper end portion of the locking member 21. An ordinary padlock 49, the bow or shackle 50 of which may be extended through openings 51 in the handle and an opening 52 in the locking member 21 to lock the handle in either one of its two positions. A coiled spring 53 positioned within the tubular portion of the handle and interposed between the handle and the locking member 21 yieldingly holds the handle in its upper position. When the handle is in its upper position the locking dog may be raised sufficiently far to disengage the segmental portion 39 of the bar 19 to permit the upper portion 19′ of said bar 19 to be swung upwardly to open position and the removal of the trunk from the holder. When, however, the handle is locked in its lower position, as shown in Fig. 5, the upward movement of the locking dog is limited so that it can be moved to only disengage the locking openings 44 and 45 but not pass out of the segmental recess 42. This construction permits the member 20 being turned a quarter turn to lock or unlock the said member 20 to the running board. When in unlocked position the holder with the trunk still locked thereto may be swung forwardly to permit the opening of the automobile door 13. A rubber guard 54 mounted on the member 19 is positioned to engage the forward wheel guard and prevent injury thereto and a handle 55 mounted on the member 20 is provided for conveniently turning said member.

In use the holder is mounted on the running board and the trunk is covered and locked thereto in the manner described, and when it is desired to open the door of the automobile it is only necessary to unlock the movable portion of the holder and swing the movable portion and the trunk forwardly until it rests upon the front wheel guard as shown in Fig. 2. While in this position the automobile door may be freely opened.

While the trunk holder is shown as mounted on only one side of the automobile it is to be understood that a holder may be mounted on both sides and that one of the trunks may be of the wardrobe type and the other of the drawer type. In supporting garments upon the hangers and maintaining the trunk in upright position, the garments will be kept in a presentable condition without the necessity of being cleaned and pressed.

From the foregoing description it will be seen that the trunk holder is of very simple construction and is well adapted for the purpose described.

What I claim as my invention is:

1. An automobile trunk holder, comprising a base member, upright trunk engaging members yieldingly engaging the base member, means for hingedly connecting one portion of the base member to the running board of an automobile to permit said member being tilted longitudinally with relation thereto, and a locking means controlled by one of the upright members for preventing the tilting of the base member.

2. An automobile trunk holder, comprising a base member, upright trunk engaging members yieldingly engaging the base member, one of said upright members extending over the upper portion of the trunk mounted on the holder, means for hingedly connecting one portion of the base member to the running board of an automobile to permit said member being tilted longitudinally with relation thereto, and a locking means controlled by one of the upright members for preventing the tilting of the base member.

3. An automobile trunk holder, comprising a base member, upright trunk engaging members yieldingly engaging the base member, one of said upright members extending over the upper portion of the trunk mounted on the holder, means for hingedly connecting one portion of the base member to the running board of an automobile to permit said member being tilted longitudinally with relation thereto, and a locking means controlled by a revoluble movement of one of the upright members for preventing the tilting of the base member.

4. An automobile trunk holder, comprising a base member, upright trunk engaging members yieldingly engaging the base member, one of said upright members extending over the upper portion of the trunk mounted on the holder and terminating adjacent the other upright member, means for locking the adjacent portions of the upright members together, means for hingedly connecting one portion of the base member to the running board of an automobile to permit said member being tilted longitudinally with relation thereto, and a locking means controlled by a revoluble movement of one of the upright members for preventing the tilting movement of the base member.

5. An automobile trunk holder, comprising a base member having means for a hinged attachment to the running board of an automobile provided with an outwardly swinging door, said hinged connection permitting the base member to be swung forwardly, upright trunk engaging members connected to the base member, one of said upright members extending over the upper portion of the trunk mounted on the holder and terminating adjacent the other upright member, means for locking the adjacent portions of the upright members together, and a locking means carried by the base member and engaging the running board for preventing the tilting of the base member, said last mentioned locking means being controlled by a revoluble movement of one of the upright members.

6. An automobile trunk holder, comprising a base member having means for a hinged attachment to the running board of an automobile provided with an outwardly swinging door, said hinged connection permitting the base member to be swung forwardly, upright trunk engaging members connected to the base member, one of said upright members extending over the upper portion of the trunk mounted on the holder and terminating adjacent the other upright member, means for locking the adjacent portions of the upright members together, and a locking means carried by the base member and engaging the running board for preventing the tilting of the base member, said last mentioned locking means being controlled by a revoluble movement of one of the upright members without unlocking the adjacent portions of the upright members.

7. An automobile trunk holder, comprising a base member having means for a hinged attachment to the running board of an automobile provided with an outwardly swinging door, said hinged connection permitting the base member to be swung forwardly, upright trunk engaging members connected to the base member, one of said upright members extending over the upper portion of a trunk mounted on the holder and having a slotted segmental portion which straddles the other upright member, a locking means carried by the other upright member which engages the segmental portion, a lock member mounted on the running board, and a lock carried by the base member and controlled by a revoluble movement of the straddled upright member for lockingly engaging the lock member of the running board to prevent tilting of the base member.

8. An automobile trunk holder, comprising a base member having means for a hinged attachment to the running board of an automobile provided with an outwardly swinging door, said hinged connection permitting the base member to be swung forwardly, upright trunk engaging members connected to the base member, one of said upright members extending over the upper portion of a trunk mounted on the holder and having a slotted segmental portion which straddles the other upright member, said segmental portion having a segmental recess and locking parts, a spring actuated dog mounted on the other upright member and entering the segmental recess and locking parts, means for limiting the movement of the dog to permit a partial turning of the upright member having the dog mounted thereon, a lock member mounted on the running board, and a lock carried by the base member and controlled by the partial turning of the upright member for lockingly engaging the lock member of the running board to prevent tilting of the base member.

9. An automobile trunk holder, comprising an endwise tiltable base member having upstanding portions, upright members yieldingly engaging said portions, a flexible trunk cover engaged by the upright members and adapted to partly cover a trunk mounted on the holder, said cover extending between the upright members and the trunk, means for hingedly connecting one end portion of the base member to the running board of an automobile, and means for locking another portion of the base member to said running board.

10. An automobile trunk holder, comprising an endwise tiltable horizontally extending base member having upstanding portions, yielding upright members engaging said portions, the yielding portions of said upright members positioned above the base member, a trunk cover engaged by the members and adapted to partly cover a trunk mounted on the holder, means for hingedly connecting one end portion of the base member to the running board of an automobile, and means for locking the other end portion of the base member to said running board.

11. An automobile trunk holder, comprising a base member having a hinged connection at one end with the running board of an automobile, upright members yieldingly connected to the base member, one of said upright members having a portion extending at an angle with relation to the other portion, said angular portion terminating adjacent the other upright member and having a slotted portion which engages a recessed portion of the said other upright member, said slotted portion also having a segmental recess, a locking dog carried by the upright member having the recessed portion which enters the segmental recess and permits a partial turning of the said upright member, means for limiting the movement of said dog, a trunk cover formed in part of flexible material and having a clip member which is engaged by the angular portion of the upright member, and a locking means for locking the other end portion of the base member to the running board, said locking means being controlled by the turning of the upright member.

In testimony whereof, I affix my signature.

GEORGE HENRY WHEARY.

Copies of this patent may be obtained for five cents each, by addressing the "Commissioner of Patents, Washington, D. C."